United States Patent [19]
Bransden et al.

[11] Patent Number: 4,874,919
[45] Date of Patent: Oct. 17, 1989

[54] LASER APPARATUS FOR REPETITIVELY MARKING A MOVING SHEET

[75] Inventors: Antony S. Bransden, Grove; John H. P. C. Megaw, Shillingford; Malcolm J. Terry, Steventon; Brooke A. Ward, Goring, all of England

[73] Assignee: The Wiggins Teape Group Limited, Basingstoke, England

[21] Appl. No.: 143,950

[22] Filed: Jan. 14, 1988

[30] Foreign Application Priority Data

Jan. 14, 1987 [GB] United Kingdom ............... 8700765

[51] Int. Cl.$^4$ .............................................. B23K 26/00
[52] U.S. Cl. ............................ 219/121.68; 219/121.6; 346/76 L
[58] Field of Search ............ 219/121.6, 121.85, 121.68, 219/121.69, 121.70, 121.71, 121.80; 346/76 L; 354/6, 12, 14, 15

[56] References Cited

U.S. PATENT DOCUMENTS

| | | | |
|---|---|---|---|
| 3,186,861 | 6/1965 | Smith et al. | 428/321.5 |
| 3,256,524 | 6/1966 | Stauffer | 346/76 L |
| 3,509,349 | 4/1970 | Molines et al. | 264/195 |
| 3,584,963 | 6/1971 | Wisner | 250/219 X |
| 3,702,094 | 11/1972 | Sinnott et al. | 354/15 |
| 3,821,753 | 6/1974 | Sinnott et al. | 354/15 X |
| 3,827,063 | 7/1974 | Sinnott et al. | 354/15 |
| 3,943,324 | 3/1976 | Haggerty | 219/121.6 |
| 3,958,253 | 5/1976 | Rueckmann | 346/76 L |
| 4,024,545 | 5/1977 | Dowling et al. | 346/76 L |
| 4,118,619 | 10/1978 | McArthur et al. | 219/121.6 |
| 4,121,595 | 10/1978 | Heitmann et al. | 219/121.6 X |
| 4,160,913 | 7/1979 | Brenholdt | 250/563 |
| 4,240,448 | 12/1980 | Heitmann et al. | 219/121.6 X |
| 4,302,654 | 11/1981 | Bennett et al. | 219/121.71 |
| 4,356,375 | 10/1982 | Josephy et al. | 219/121.68 |
| 4,378,480 | 3/1983 | Langhans | 219/121.7 |
| 4,397,483 | 8/1983 | Hiraishi et al. | 282/27.5 |
| 4,401,992 | 8/1983 | Vorst et al. | 346/76 L |
| 4,496,961 | 1/1985 | Devrient | 346/206 |
| 4,499,361 | 2/1985 | Brinker | 219/121.7 |
| 4,499,362 | 2/1985 | Martin | 219/121.61 |
| 4,507,535 | 3/1985 | Bennett et al. | 219/121.71 |
| 4,519,680 | 5/1985 | Grollimund | 350/486 |
| 4,537,809 | 8/1985 | Ang et al. | 219/121.69 X |
| 4,568,815 | 2/1986 | Kimbara et al. | 219/121.7 |
| 4,612,555 | 9/1986 | Hongo et al. | 346/108 X |
| 4,612,556 | 9/1986 | Pinat de Moira | 346/215 |
| 4,740,269 | 4/1988 | Berger et al. | 156/643 |

FOREIGN PATENT DOCUMENTS

| | | |
|---|---|---|
| 27698 | of 0000 | European Pat. Off. . |
| 47604 | of 0000 | European Pat. Off. . |
| 0021165 | 1/1981 | European Pat. Off. . |
| 0042173 | 10/1982 | European Pat. Off. . |
| 0098013 | 1/1984 | European Pat. Off. . |
| 0119034 | 9/1984 | European Pat. Off. . |

(List continued on next page.)

OTHER PUBLICATIONS

"Fast Laser Pulses Can Etch a Pattern in a Moving Part on a Production Line", Laser Focus, Jul. 1975, p. 78.
"Neodymium Yttrium Aluminum Garnet (Nd: YAG) Laser Marking System", SPIE vol. 247, Advances in Laser Engineering and Application (1980, p. 18.

(List continued on next page.)

Primary Examiner—C. L. Albritton
Attorney, Agent, or Firm—Burns, Doane, Swecker & Mathis

[57] ABSTRACT

The energy of a laser beam (32) is used to form images at intervals along a lengthwise moving web (10). The images are formed along a plurality of axes spaced transversely of the web so that after slitting and cutting an image appears on each sheet. The laser beam (32) is directed across the web and is repetitively and successively switched by rotating optical mirrors in assemblies (71a–71g, 72a–72g) located at intervals across the web to scan image-bearing masks (FIG. 2) rotating with the mirrors. The beam impinges on respective mirrors of successive assemblies. The mirror assemblies are conical mirror segments (78) or plane mirrors cooperating with a fixed conical mirror segment (FIG. 5) to produce a focussed line (82) that is fixed in space and scans the rotating mask. The scanning line is re-imaged (90) on the web (10).

44 Claims, 4 Drawing Sheets

FOREIGN PATENT DOCUMENTS

| | | |
|---|---|---|
| 3431577 | of 0000 | Fed. Rep. of Germany . |
| 2820462 | 3/1979 | Fed. Rep. of Germany . |
| 3418188 | 9/1987 | Fed. Rep. of Germany . |
| 2158921 | 6/1973 | France . |
| 59-157612 | 1/1985 | Japan . |
| WO87/05850 | 10/1987 | PCT Int'l Appl. . |
| 1603752 | of 0000 | United Kingdom . |
| 2022492 | of 0000 | United Kingdom . |
| 2022987 | of 0000 | United Kingdom . |
| 2027628 | of 0000 | United Kingdom . |
| 2032323 | of 0000 | United Kingdom . |
| 2127567 | of 0000 | United Kingdom . |
| 2131767 | of 0000 | United Kingdom . |
| 2133352 | of 0000 | United Kingdom . |
| 2143649 | of 0000 | United Kingdom . |
| 2144873 | of 0000 | United Kingdom . |
| 2170504 | of 0000 | United Kingdom . |
| 2173452 | of 0000 | United Kingdom . |
| 972071 | 10/1964 | United Kingdom . |
| 998711 | 7/1965 | United Kingdom . |
| 1128616 | 9/1968 | United Kingdom . |
| 1405487 | 9/1975 | United Kingdom . |
| 2032325 | 5/1980 | United Kingdom . |
| 1569725 | 6/1980 | United Kingdom . |
| 2044175 | 10/1980 | United Kingdom . |
| 1588980 | 5/1981 | United Kingdom . |
| 1602133 | 11/1981 | United Kingdom . |
| 2074493 | 11/1981 | United Kingdom . |
| 2094211 | 9/1982 | United Kingdom . |
| 2101029 | 1/1983 | United Kingdom . |
| 2113142 | 8/1983 | United Kingdom . |
| 2118882 | 11/1983 | United Kingdom . |
| 2126955 | 4/1984 | United Kingdom . |
| 2137068 | 10/1984 | United Kingdom . |
| 2149644 | 6/1985 | United Kingdom . |
| 2155754 | 10/1985 | United Kingdom . |

OTHER PUBLICATIONS

*Dagens Industri*, vol. 7, No. 118, Nov. 23, 1983, p. 42.

"The Advance of Laser Coding", Dr. Greg Sharp--Dent, *Packaging*, Jul. 1983.

Article, *Xerox Disclosure Journal*, vol. 5, No. 2, Mar.-/Apr. 1980.

"Product Marking with ND:YAG and $CO_2$ Lasers", M. J. Weiner, SPIE Vo. 86, *Industrial Application of High Power Laser Technology (1976), p. 23*.

"Lasers—A Cut Above the Rest", Dr. Ian Spalding, *Lind-Up*, Jan.-Mar. 1986.

Article, *Financial Times*.

"Laser Mark", Lumonics.

"Laser Brand", Material from Laser Applications.

"Simply Code It with Laserprint", Material from Laserprint.

LASER APPARATUS FOR REPETITIVELY MARKING A MOVING SHEET

This invention relates to a method and apparatus for marking moving sheet material by the action of light thereon. The invention has particular application to the marking of a longitudinally moving web of material such as paper. A particular concern of the invention is with using laser energy to mark the material. It will be understood that in this context "light", whether from a laser or other source, includes radiation both within and without the visible spectrum. "Marking" of a sheet is used herein to mean effecting a change in the sheet by impinging light on the sheet. Such a change may, for example, be thermally induced or photo-chemically induced, and may or may not be visible. The practice of the invention finds particular application where the marking to be applied to the sheet is in accord with some prescribed pattern or design. The invention will be particularly described in relation to marking paper with a visible image.

It is long-established in paper making to water-mark the web on the Foudrinier wire. The web is so marked at sufficient intervals both across and along the web such that when it is finally sliced and cut into individual sheets, each sheet will bear a water-mark associated with the paper manufacturer. In practice water-marking in the conventional fashion is only economical for relatively expensive grades of paper that are produced at relatively slow speed. Conventional water-marking is not normally applied to papers in which the water-marking may be obscured by subsequently applied coatings. It is not applied with the paper that is to be used in the manufacture of carbonless-copy paper, except for letter-head or relatively low tonnage premium qualities, primarily on the economic ground abovementioned. Nonetheless, the manufacturer of such papers may wish to identify the paper with himself, since cut sheet as packed and sold will normally bear the label of some other company. Thus the need arises for some other means of marking which is identifiable but is not too obtrusive for the use for which the paper is intended.

Many materials such as metal, plastics and paper can be marked by use of laser light which may remove a coating layer or act on a surface layer of a base material. Such action may be a removal or "burning" of material or other thermally induced change, such as a colour change, depending on the material in question. An example of the use of lasers for this purpose is described in the journal "Laser Focus", July 1975, pages 28 to 32 under the heading "Fast laser pulses can etch a pattern on a moving part on a production line". Apparatus for this general purpose is available from various manufacturers. In the commercially available apparatus a mask containing the pattern to be marked on the product is imaged onto the product. The mask is in the form of a stencil through which light is transmissible. The whole mask is illuminated with a laser pulse to produce a pulsed image on the product. By using short pulses of sufficient energy, the apparatus can clearly mark a rapidly moving surface.

Such apparatus can be used for the marking of paper. In principle it can be used on a paper making machine or in other machines for processing manufactured web, such as coating machines that apply the microcapsules for carbonless copy paper. Such a web may be typically up to several meters wide and is normally subsequently longitudinally slit into reels which may then be used to provide sheets either in pre-cut form or to provide continuous stationery. Thus each longitudinal section to be slit from the web requires to be marked at intervals along its length. Whilst in principle this can be done in the pulse imaging system described with the aid of beam splitters, beam splitting divides the pulse energy requiring an increase in the power of laser source for a required image intensity at the web. The pulse power required is relatively high since the whole mask area as imaged on the web is illuminated at one time and the effective dwell time on the moving web is necessarily short in order to prevent blurring of the image. Typically a web may be moving at speeds up to 20 m/s.

There have been numerous proposals to use laser energy to perforate cigarette tipping paper. Here the object is to form small perforations not to make any image on the paper. Such proposals have used optical switching means, possibly combined with focussing arrangements, to direct a laser beam to successive locations across and along the web. These proposals involve the use of staggered arrays of optical elements, often arranged in a rotary fashion. Examples are found in U.K. patent specifications GB Nos. 1603752, 2022492, 2027628 and 2032323; and in European specifications EP No. 0021165 and 0047604. Optical switching arrangements are also disclosed in GB No. 2074341 and EP No. 0042173. An alternative to optical switching is disclosed in GB No. 2118882 in which a web of cigarette tipping paper passes over a drum containing spaced circumferential rows of apertures at which individual lasers located in the drum are directed.

Specification GB No. 2161752A discloses the application of laser energy to a web at selected points. GB No. 2133352 describes how a laser beam can be used to mark a moving product by use of electronically-controlled beam deflection to produce indicia on a dot matrix basis.

It is also known to laser engrave materials, including paper. Such a system is described in GB No. 2126955 in which the engraving image and the object to be engraved are essentially raster scanned by a focussed laser beam. This is not suitable for multiple marking of a moving web.

There will be described more fully below apparatus in which a continuous wave CW laser is utilised to provide the marking of the web at several locations transversely of the longitudinally moving web and repetitively along the web. The input beam is sequentially switched to the several output locations by optical elements and may be arranged to provide almost continuous use of the laser beam energy. Effectively the optical switching elements serve to sequentially establish a plurality of optical paths terminating at the output locations but having a common input for receiving the laser beam. It is of particular interest to mark the web with an image which is derived from an image-bearing mask. The apparatus to be described scans the mask which enables a lower power beam to be used than would be the case for imaging the whole mask.

To effect scanning, the incoming laser beam is focussed to a predetermined configuration which is scanned across the mask so as to modulate the intensity distribution. The scanning of each mask is performed in the apparatus described below by focussing the beam to an elongate configuration that is fixed in space and moving the mask through the focus. Such a focus is required for each output location across the web. The foci intercepted by the respective masks may lie in a plane that is essentially at the web surface. This is a contacting system in which the web is conveniently guided over the surface of a rotating drum. The masks are located at the surface and the other optical elements are contained within the drum. It is preferred, however, to use a non-contacting arrangement in which the mask-scanning foci are formed at intermediate points in the respective optical paths and are re-imaged and thus focussed onto the web by output optics in each path. The re-imaged line foci at the web are modulated in accord with the mask image as the mask is scanned. Since the modulated line at the web is also spacially fixed, the web itself provides the necessary scanning movement to reproduce the image on it.

Two techniques will be described for performing beam-switching and focussing. The first uses conical mirror segments to perform both beam switching and focussing. This is done in practice by mounting the segments in a continuously rotating structure. The second technique employs conical mirror segments to perform the focussing and plane mirror assemblies to perform the beam switching. In this case the conical mirror segments are fixedly mounted and the plane mirror assemblies are mounted to a rotary structure. Conical mirrors have the property of producing a line focus as discussed above.

In implementing the first technique the beam-switching and focussing to lines may be conveniently performed by sets of conical mirror segments arranged in a rotary structure whose axis of rotation extends transversely of the web. Each set of conical mirror segments is located in an annulus, the sets being transversely spaced across the web. The segments of each set are angularly spaced and the sets are angularly offset so that as seen by an incoming laser beam they are interleaved so that the beam impinges on only one conical mirror segment at a time and preferably on mirror segments from different sets in succession as the sets rotate. With the aid of other optical elements the beam can be brought to its line foci at the positions required for imaging on the paper.

By orientation of the conical mirror segments to have their cone axes coincident with the axis of rotation, each line focus produced by the incoming beam impinging on a moving mirror is fixed in space and the successive line foci produced by any one set of conical mirrors lie at the same fixed spacial point. In this case the line foci are not only fixed in a direction transverse to the direction of web movement but are fixed in the longitudinal direction also. The scanning of the relevant mask by such a fixed line is effected by moving the mask relative to the line beam. Conveniently the masks can be carried by, or otherwise rotate synchronously with, the structure carrying the mirror segments. One arrangement is to have a respective mask for each mirror segment that is positioned to traverse the focussed line as the mirror traverses the laser beam.

The second technique has one fixed conical mirror in the optical path to each output location across the web. These fixed mirrors are conveniently stationed in line with the respective longitudinal sections of the web to be marked. Adjacent each conical mirror there is a respective set of plane mirror assemblies arranged in an angularly offset manner for rotation to repetitively switch the beam to the conical mirror. The sets of plane mirror switching assemblies are themselves angularly offset one from another, that is they are progressively angularly staggered across the web so that as seen by the incoming beam the mirrors are interleaved to provide a repeated sequence of markings across the web.

The plane mirror assemblies preferably use pairs of mirrors, specifically at right angles. A first mirror of the pair is aligned to come into a position facing the associated conical mirror as rotation progresses. The second is radially displaced from the first to intercept the beam so as to reflect it to the first. A particular adaptation of this arrangement is to have the second mirrors of the pairs alternately positioned at greater and lesser radii around the set, i.e. on inner and outer circles. With such an arrangement the incoming beam is laterally displaced between the inner and outer circle radii by an input beam chopper that is rotated synchronously with the rotation of the switching mirrors.

The fixed conical mirrors produce line foci as already described and the image-bearing masks are carried with the rotating plane mirrors so as to be scanned by the line foci in the manner already discussed. Preferably the modulated line foci are re-imaged onto the web.

According to one aspect of the present invention there is provided a method of marking sheet material moving along a predetermined path comprising the steps of:

repetitively establishing by optical path-switching means an optical connection between an input portion of an optical path and an output portion of the optical path, which output portion terminates at the moving sheet at a location that is spacially fixed in a direction transverse to the direction of sheet movement, directing a beam of light along the input portion of the optical path at least at times when said optical connection is established whereby the beam of light impinges on the moving sheet at said location, said beam of light causing a change in the sheet to mark same at spacial intervals in the direction of movement; characterised in that the beam of light is focussed to a predetermined configuration at said location, and characterised by modulating the predetermined beam configuration by means of an image-bearing mask to mark the sheet in accord with the image.

The configuration abovementioned may be an elongate configuration, such as a straight line, extending transversely to the direction of movement of the sheet.

In the embodiments to be described a scanning movement is effected between the mask and the predetermined beam configuration. The beam may be focussed to its predetermined configuration at a point preceding the aforesaid location and the configuration re-imaged at the location. The scanning movement between mask and beam is effected at this preceding point.

There will be described respective optical arrangements in which the beam focussing is performed by the optical path switching means and by means separate from the switching means.

More particularly, the method of the invention may be used to mark a sheet along at least one further axis in the direction of sheet movement and to this end preferably comprises repetitively establishing by said optical switching means an optical connection between said input portion and a further output portion of a further optical path, which further output portion terminates at a further location that is spacially fixed in a direction transverse to the direction of sheet movement and is transversely offset from the first-mentioned location, the optical connections established in the first-mentioned optical path being interleaved in time with those established in the further optical path, the direction of the beam of light along said input portion occurring at least when the optical connections to the first-mentioned and further output portions are established, whereby the beam of light also impinges on the moving sheet at said further location, and focussing said beam of light at said further location to a predetermined configuration and modulating this latter configuration by means of an image-bearing mask to also mark the sheet at spacial intervals in the direction of movement along an axis transversely offset from the first-mentioned markings.

In another aspect the invention provides an optical apparatus for use in producing an image on a moving sheet of material, comprising a beam entry point for receiving a laser beam in a predetermined alignment, at least one mask-receiving means for receiving a mask bearing an image, optical means including first and second optical elements carried by a structure repetitively movable in a predetermined path to intercept the beam at different times in each such movement to switch the beam to the or different ones of the mask-receiving means, and said optical means being adapted to focus the received laser beam to a line at the mask-receiving means to which the beam is switched, the mask-receiving means and optical means being so arranged to provide a relative motion between the line and the mask-receiving means at which it is focussed for scanning a mask received therein.

The structure mentioned in the preceding paragraph may be rotatably mounted, whereby each of said elements describes an arcuate path, and may have drive means coupled to it to continuously rotate same.

In one embodiment of the optical apparatus described below, the first and second elements are adapted to focus the beam intercepted thereby to a line fixed in space as the intercepting elements move and in which the mask-receiving means is or are mounted to said structure to move in synchronism therewith so as to effect scanning with respect to the relevant spacially fixed line. These first and second elements may comprise conical mirror segments mounted to have their cone axes coincident with the axis of rotation of the structure. They may be mounted to intercept the received laser beam at different points along the beam to provide respective line focusses that are spacially separated.

In one preferred apparatus, the first element is one of a first set of like elements mounted to intercept the received beam at the same first point along its path and at different times during the movement of said structure, and the second element is one of a second set of like elements mounted to intercept the received beam at a second point along its path and at different times during the movement of the structure that are interleaved with the beam interceptions of the first set of elements.

As mentioned above, the mask receiving means may be mounted to the structure and in this case the elements of the first set may provide respective line segments at the same first spacial point upon their respective interceptions of the beam and the elements of the second set provide respective focussed lines at the same second spacial point upon their respective interceptions of the beam. More particularly where conical mirror segments are employed, then preferably the elements of the first set have conical surfaces that are segments of a first cone and the elements of the second set have conical surfaces that are segments of a second cone.

In the apparatus there may be first and second fixed devices for re-imaging the focussed lines at said first and second points respectively to third and fourth spacially fixed points respectively.

In another embodiment of the apparatus of the invention, the optical means includes at least one fixed optical element for focussing the beam to a line, and the aforementioned first and second optical elements comprise plane mirrors. In this case the first and second elements may be mounted for beam interception at different points along the beam and a respective fixed optical element is then associated with the first and second elements to receive the beam intercepted thereby and focus same to a line. The or each fixed optical element may comprise a conical mirror segment.

More particularly in this embodiment, preferably the first element is one of a first set of like elements mounted to perform beam interception at a first point and at different times during the movement of said structure, and said second element is one of a second set of like elements mounted to perform beam interception at a second point displaced from the first point in the direction of beam impingement thereon and at different times during the movement of said structure that are interleaved with the beam interception of the first set of elements. A single respective fixed optical focussing element is associated with each of said first and second sets of elements, and each optical element of the first and second sets comprises a pair of plane mirrors. These plane mirrors of each pair may be set at right angles to one another, to reverse the direction of the beam impinging thereon.

In a preferred arrangement for the just-discussed embodiment the optical elements of the first set are offset from those of the second set as seen normal to the direction of beam impingement and further comprises a further optical path switching means for receiving an input beam directed to said entry point and for switching said beam to first and second paths intercepted by said first and second sets of elements respectively, said further optical path switching means being operable in synchronism with the movement of the structure.

It is also an aspect of the present invention to provide apparatus for repetitively marking a moving sheet of material with an image comprising:

optical apparatus of the invention as set forth above
means for generating and providing a laser beam at said beam entry point of the optical apparatus; and
means for moving a sheet along a predetermined path to receive images of the or each mask scanned by a line segment. In this marking apparatus, the means for generating and providing the laser beam preferably includes a continuous wave laser, means for monitoring the alignment of the laser beam at the entry point to provide a signal indicating error in alignment and means in the laser beam path to said beam entry point for adjusting the alignment of the laser beam in accord with said error signal. It may further comprise means connected in a feedback path with the laser to monitor and regulate the laser output power.

Two embodiments of the invention for marking a moving web of paper will now be described with reference to the accompanying drawings in which.

In the figures, like reference numerals refer to like parts.

Figure 1:
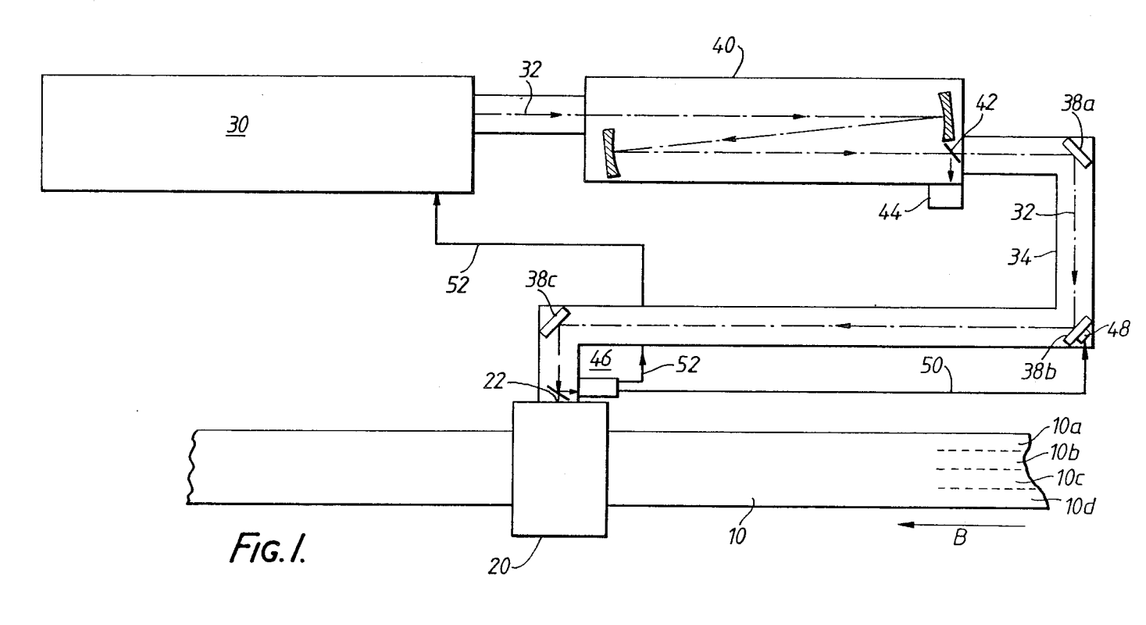
FIG. 1 is a schematic diagram of a laser apparatus for repetitively marking an image on longitudinal sections of a longitudinally moving web of paper.

Referring to FIG. 1 a web of paper 10 is shown as moving lengthwise from right to left in the direction of arrow B along a path guided by appropriate rollers (not shown). For the purposes of this description, it is assumed that the web will eventually be slit into a number of longitudinal sections, such as 10a–10d and that each section will be cut into individual sheets. The purpose of the apparatus is to mark each of the eventual sheets with a word or logo indicative of the manufacturer.

Figure 2:
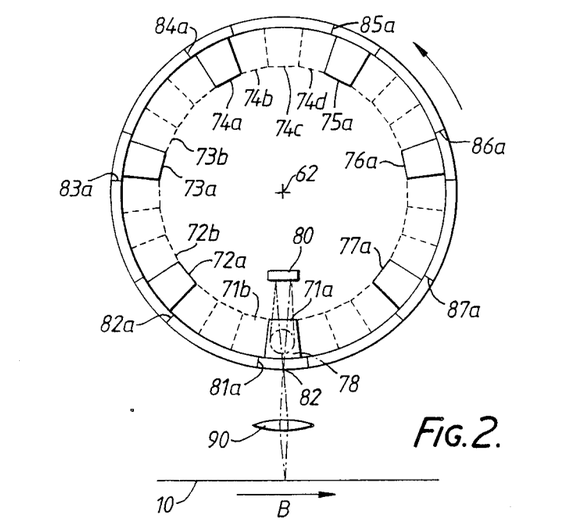
FIG. 2 shows a diagrammatic illustration of one optical system including a rotary mirror arrangement for use in the apparatus of FIG. 1 looking in the axial direction of arrow A in FIG. 3, the mirror arrangement providing for both beam switching and line focussing.
Figure 3:
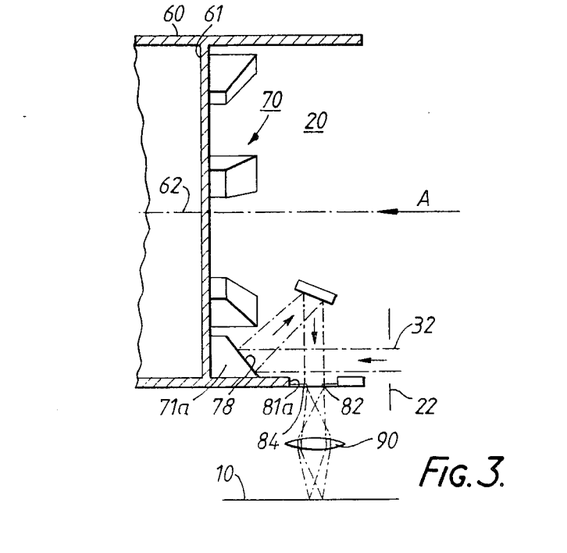
FIG. 3 shows a longitudinal axial section through the mirror arrangement of FIG. 2.

Mounted along the path of the web is an optical system 20 shown more fully in FIGS. 2 and 3 to provide a series of marks along each longitudinal section 10a–10d of the web at intervals which will allow the mark to appear on each cut sheet. The optical system 20 receives a laser beam at an input location or beam entry point 22. The beam is generated by a continuous wave laser 30, such as a 1 KW or greater carbon dioxide gas laser. The beam 32 is shown in dot-dash line and is transmitted through an enclosed optical path 34 to the beam entry point 22. The exact path will depend on local circumstances but includes a beam modification unit (BMU) 40 to control the beam at the entry point 22. The beam is guided in its path with the aid of plane mirrors such as 38a,b,c.

The BMU 40 is effectively a telescope whose function is to provide a beam of required size and divergence at the entry point 22 from the beam emergent from the laser 30. The emergent beam will have a beam size and divergence particular to a given laser and thus the optical design of the BMU is dependent on a knowledge of the beam characteristics of the laser employed. The design of the BMU optics is a matter within the competence of those skilled in laser systems and need not be further discussed here.

The beam characteristic at point 22 may be monitored at that point or as is illustrated, it may be monitored in terms of the beam emergent from BMU 40 by a partial mirror 42 for tapping off a small proportion of the beam to a detector 44. Such detectors are known in the laser art and will not be described further.

In any event it may prove desirable to have means of monitoring the alignment of the beam at the entry point 22 as well as its intensity. Beam intensity is of importance in order to obtain an intensity at the web surface that is sufficient to produce a visually acceptable mark without undue damage to the material. To this end a separate monitoring arrangement 46 for tapping off a small proportion of the beam and detecting its alignment and intensity may be located at or adjacent the point 22. The alignment measurement may be used to generate a control signal for one of the earlier beam deflecting mirrors, such as 38b. The mirror may be movably mounted to be motor driven along orthogonal axes by means diagrammatically indicated at 48 and responsive to the alignment control signal applied over line 50. The intensity measure signal is applied over line 52 as a feedback signal to laser 30. A conventional modern laser is electronically controlled to establish its output power and thus is readily amenable to being connected into a power control feedback loop. There is advantage in measuring intensity as near to the final point of application of the beam as possible so as to not only compensate for fluctuations in the operation of laser 30 but also in the beam path.

Having described the manner in which a laser beam is established, the laser processing optical system 20 for marking the web will now be described with reference to FIGS. 2 and 3. The system will be described primarily with reference to the optical elements employed for marking of one longitudinal section 10a of the web. Similar arrangements for marking the other sections are spaced transversely across the web and are angularly interleaved in a manner that will be discussed subsequently.

Although reference has been made to an input location or beam entry point 22, there is no precisely defined point as such. The apparatus thus far described provides a laser beam 32 of predetermined size and alignment to enter the optical system shown in FIGS. 2 and 3. As discussed beam alignment and intensity can be monitored at a point adjacent the input location 22 which may be regarded as a notional plane intersecting the beam entry into the optical system as indicated in FIG. 3. At this point the beam will be of circular cross-section having a diameter of say 8 mm.

Figure 4:
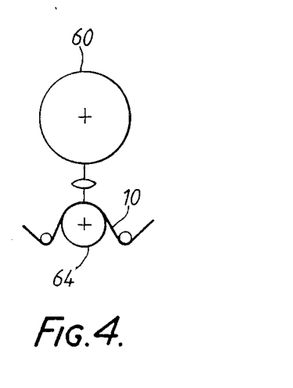
FIG. 4 shows a preferred arrangement for accurately locating the web with respect to the laser processing optics.

The optical system 20 includes a rotary construction, conveniently supported within a cylindrical drum 60 which is mounted for rotation about its axis 62. A motor drive (not shown) is provided to rotate the drum at a uniform speed or at a speed synchronous with web speed. The drum 60 is mounted above and spaced from the path of the web 10 with the drum axis normal to the direction of longitudinal movement of the web. In each marking of the web the optical system focuses a line of laser light on the surface of the web. To ensure accurate positioning of the web at the impingement of the line on the web, the web is preferably guided as shown in FIG. 4, where the web passes over a free-running roller 64 whose surface is normal to the optical axis at the point of impingement. For ease of illustration and understanding in FIGS. 2 and 3, the web is assumed to be moving in a plane beneath the drum 60.

In its hollow interior the drum carries a plurality of sets of mirror segments the sets being axially spaced across the drum. For clarity of illustration only one set 70 is fully shown comprising, for example, seven segments 71a-77a, arranged in an annulus, equi-angularly spaced. Each segment is formed from a copper block having one surface 78 shaped and polished in the form of a segment of a cone whose axis coincides with the rotation axis 62 of the drum 60. The segments are mounted at the interior surface of the drum and may be located by an internal annular wall 61. Thus as mounted within the drum the conical mirror faces 78 form segments of a frusto-cone coaxial with the drum axis with the cone apex pointing away from the direction of the incoming laser beam 32. The laser beam axis is parallel to axis 62 and its radial offset from the axis the same as that of the segments so that each conical mirror segment intersects and traverses the beam as the drum is rotated. FIGS. 2 and 3 show the beam at the centre point of its impingement on one of the mirror segments 71a.

It is a characteristic of the conical mirror, rotated in this orientation, that as long as the laser beam impinges on it, it will focus the beam into a spacially fixed line segment. This line segment lies on the cone axis in the absence of any other optics. As the drum rotates the segments 71a-77a perform both beam switching and focussing the beam to a line. The line-focussed beam will be referred to as a line beam.

The optical system 20 further includes a plane mirror 80 fixedly supported within the drum 60, and positioned and oriented to produce the line focus at the wall of the drum. The line beam produced by segments 71a-77a exits the drum through respective apertures 81a-87a in its wall that are aligned with the mirror segments. It will be appreciated best from FIG. 2 that as each segment 71a-77a intercepts the incoming laser beam 32 it produces for the duration of the interception a spacially fixed line beam at a point 82 that lies in the axial direction and thus scans at least part of the associated aperture 81a-87a moving transversely past it. The optical axis through point 82 is radial to the drum axis so that the line beam lies in the drum wall and the extended optical axis intersects the web normal to its plane and to the direction of movement. Exterior to the drum the optical system 20 includes an imaging lens 90 that is mounted on the extended optical axis to image the line beam onto the web surface. Thus as the line beam scans one of apertures 81a-87a, its image, also fixed in space, scans a portion of the moving web surface. If the line beam is modulated at the aperture the modulation is reproduced in the line beam acting on the web surface so as to mark it. By placing a means for modulating the line beam, that is for selectively masking the beam, in the aperture, the image carried by the modulating means is reproduced on the paper surface.

Figures 7, 8, 9, 10:
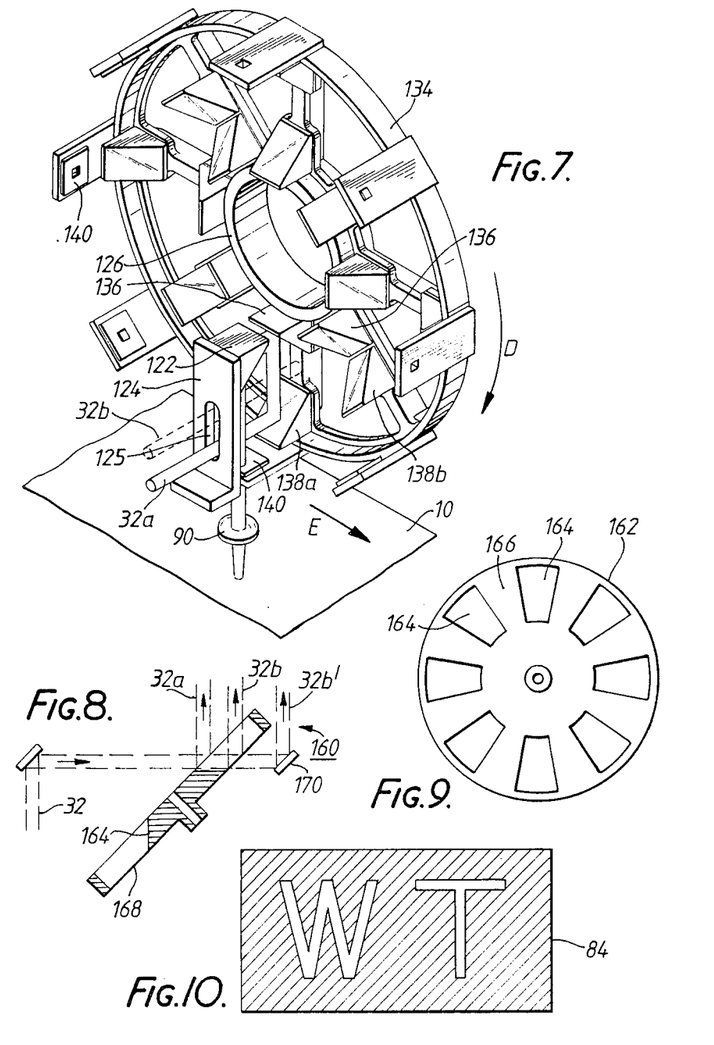
FIG. 7 is a perspective view of such a wheel structure with the associated imaging lens for reproducing an image on a moving web.
FIG. 8 is a section through an input beam chopper for switching the beam on between laterally-spaced input paths to the optical system of FIG. 5.
FIG. 9 is a face view of the beam chopper of FIG. 8.
FIG. 10 shows a stencil mask for using the processing optics in each of the optical systems.

As seen in FIGS. 3 and 10 the modulating means 84 is a stencil cut with a trade name, logo or whatever image is to be reproduced on the paper and that image is scanned by the line beam. The stencil mask is a thin sheet of reflective copper located in the aperture at the outer drum surface. Thus the point 82 of the line beam focus is at the drum surface. At the beam scans the image opening in the stencil the modulated line reproduces the image on the web as is best seen in FIG. 3. If the peripheral speed of the drum is the same as that of the web, the mask image will be reproduced exactly on the paper; if not, the reproduced image aspect ratio will not be 1:1. The maximum width—in the direction of the line beam—of the stencil opening is less than the length of the line segment. In reproducing an image from a stencil, it has to be appreciated that the imaging lens 90 produces a reversed image.

The illustrated mirror segment set has seven apertures and thus seven identical masks are to be located in the respective apertures if identical marks are to be employed throughout.

It will be appreciated that the arrangement thus far described will produce a series of spaced marks, seven per rotation of the drum, along a longitudinal axis of the web. Thus this series of marks may be aligned along one of the longitudinal sections, such as 10a, into which the web is to be later slit. The beam switching technique is extended to further laterally spaced optical systems whereby a plurality of longitudinal series of marks may be made spaced transversely across the web, so as to mark the four longitudinal sections 10a-10d shown in FIG. 1.

To this end the drum 60 is provided with three further sets of seven mirror segments 71b-77b, 71c-77c and 71d-77d. The segments of each set are equiangularly spaced about the axis 62 but the sets are angularly offset from one another. The sets are axially displaced from one another along axis 62 so that the drum 60 contains four optical beam-switching, focussing and imaging systems 20 as already described in FIG. 3. That is, in addition to the set of mirror segments there is an associated set of aligned drum apertures, each containing a stencil mask, and a respective plane mirror 80 and imaging lens 90 for projecting a line beam onto the web surface. The four transversely-spaced plane mirrors 80 and imaging lenses 90 are supported on gantries (not shown) extending across the web and provide four transversely fixed outputs for marking the web.

The construction and operation of the complete laser processing optics may be better understood by referring to FIG. 2. This shows in phantom the next set of segments 71b-77b spaced further along the axis but angularly offset from the segments 71a-77a. The next two sets are likewise offset such as is illustrated by way of example for segments 74a, 74c, 74d mutually offset with and between segments 74a and 75a. Thus as seen along the axis the segments of the sets are interleaved and the beam is successively switched by a respective segment from each set.

This arrangement successively produces a mark in each of the four web sections 10a-10d in a sequence that is repeated seven times in each rotation of the drum in the illustrated case.

Both the number of mirror segments in a set and the number of sets can be varied. There is advantage in having the annulus traced by the laser beam 32 relative to the drum filled with mirror segments in making maximum use of the CW laser power. At the far side of the drum from the beam entry absorbent material can be placed to absorb any laser light that passes the optical system. In trying to utilise the greatest number of segments regard has to be had to the necessity that the beam should impinge on each mirror segments long enough to scan the stencil mask image. Thus the angular extent of the segment cannot be reduced too far. Additionally account needs to be taken of the physical width of the beam relative to the mirror segment. In a prototype apparatus the beam had a diameter of 8 mm. The segments were about 35 mm wide in the direction of rotation so that the beam was fully intercepted by the mirror over a distance of about 19 mm. The full intensity of the line-focussed beam is thus only realised over this lesser distance.

In the practical implementation of the above described apparatus, it is recommended that the following provisions also be made.

All stationary optics in the system are cooled to prevent possible distortion caused by overheating. A temperature controlled coolant is used and maintained above the 'dew point' to prevent condensation on the mirror surfaces. The imaging lens assemblies are supplied with 'dry' and 'oil free' compressed air to prevent debris from collecting on the lens surfaces, and to stop 'beam blocking' caused by vapour and debris from the web transport apparatus and related processes absorbing a significant portion of the laser beam. In order to assist efficient use of the laser energy vapour and debris from such processes must be effectively removed from the optical system, particularly at the beam-switching mirrors, using a combination of compressed air jets, extraction devices and shielding nozzles.

In the apparatus described so far, the conical mirror segments have performed the dual function of optical path switching and beam focussing to a line. Reference will now be made to FIGS. 5 to 9 of the drawings which show three functional changes from the apparatus described above, but to produce the same end result. These changes are summarized as: separating the switching and focussing functions, using a combination of fixed and rotating mirrors to perform these functions, and specifically using fixed conical mirrors and plane mirror assemblies for switching; and using a further optical switching arrangement at the input to provide two sets of optical paths to use the beam as efficiently as possible.

FIGS. 5 to 9 show an alternative form of the optical system 20 and are intended to receive the laser beam at the input point or plane 22 and manipulate the beam to mark the web at intervals along each of a plurality of longitudinal sections in the manner already described using a line-focussed beam to scan an image-bearing mask.

Figure 5:
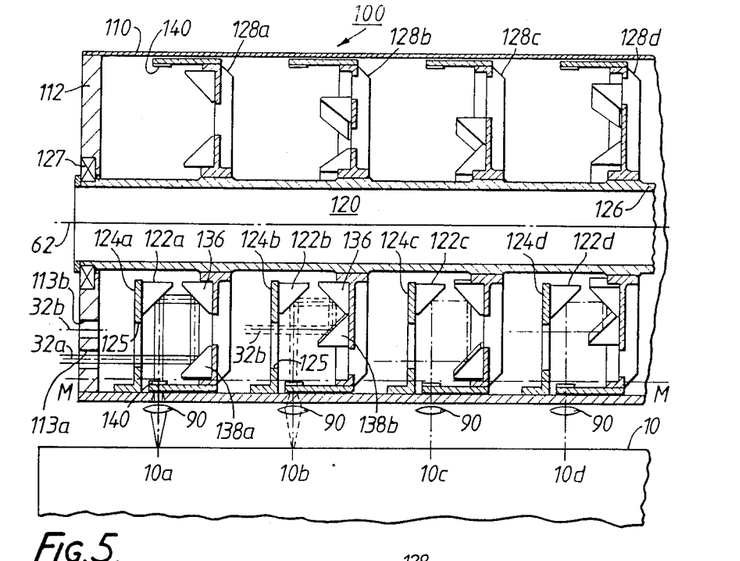
FIG. 5 shows a longitudinal axial section through another optical system for use in the apparatus of FIG. 1 and in which the beam focussing and beam switching is performed by separate fixed and rotary mirrors respectively.

FIG. 5 shows an axial section through part of a structure 100 extending across the web. The structure comprises a frame 110 fixedly supported to extend across the web and supports within it a rotary structure 120 carrying switching mirrors. The axis of the rotary structure is denoted 62. The frame carries a set of conical mirror segments 122a–122d each of which is mounted to a respectively upright support 124a–124d spaced across the web. The conical segments face outwardly and are mounted in a line equidistant from axis 62. The input beam is received at the left as seen in the figure but is optically switched in a manner to be described so as to impinge on each conical mirror from the right. The mirrors focus the beam to a line along an axis M—M which is the common axis of the conical mirrors and which is intersected by the image-bearing masks as described below. The lines modulated by the mask image are re-imaged by lenses 90 onto the respective longitudinal sections of the web 10a, 10b and so on. The end result, therefore, is as described in the previous embodiment.

The rotary structure 120 is supported within the frame 110 and includes a shaft 126 supported in bearings 127 in the end walls 112 of the frame. The shaft is rotated by a motor drive (not shown) and carries sets of beam switching mirrors spaced along the shaft to cooperate with respective conical mirrors 122a–122d Each set of beam switching mirrors is supported on what may be described as the spokes of a wheel structure whose hub is secured to the shaft 126 to rotate with it. The wheels 128a–128d are of identical construction and are located to rotate adjacent the respective conical mirrors 120a–120d to successively and repeatedly intercept the incoming beam and to direct it to the associated conical mirrors for successively imaging the web sections 10a–10d. To this end the wheels are successively angularly offset across the web as will become clearer from the following description.

Figure 6:
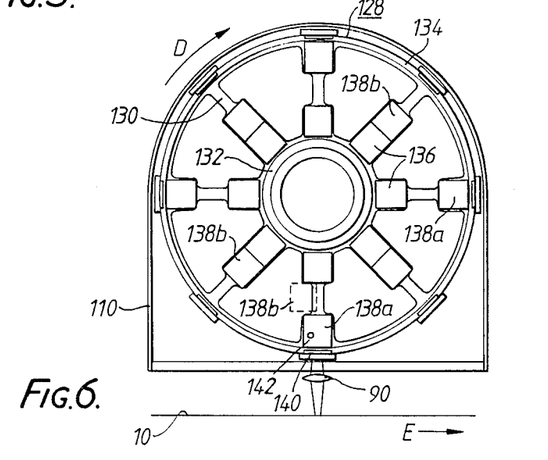
FIG. 6 shows a face view of one wheel structure as used in the optical system of FIG. 5, the wheel structure carrying rotary switching mirror assemblies.

The construction of a wheel will be given with reference to FIGS. 5 and 6. FIG. 6 shows a wheel 128 as seen from the left in FIG. 5 and in the beam intercepting position of wheel 128a.

The wheel 128 illustrated has eight equiangularly spaced spokes 130 extending from a hub 132 secured to shaft 126 to a circular perimeter 134 that rotates within the frame 110. Each spoke carries a pair of plane mirrors disposed at 90° to one another to reverse the direction of the incoming beam. Each pair of plane mirrors comprises a radially inner mirror 136 arranged on a common circle that intercepts the line of the conical mirrors so that as the wheel rotates each inner mirror comes into facing position with the associated conical mirror as can be seen from FIG. 5. The outer mirrors 138 of the pairs are arranged alternatively on a first outer circle—mirrors 138a—and a second smaller radius outer circle—mirrors 138b. The separation of the outer mirrors into a regular sequence of circles could be extended in principle to three or more such circles. The effect of dividing the outer mirrors into two circles is to double the angle between successive mirrors on the same circle enabling more wheels to be utilised for a given angle subtended by each mirror.

Supported at the outer extremity of each spoke of the wheel is a mask holder 140 so that as each mirror pair moves into beam intercepting position, it directs the beam onto the associated conical mirror to form the line beam spacially fixed as before to scan the mask moving with the wheel.

FIG. 5 shows the beam 32a passing through an aperture 113a of the end wall 112 parallel to the axis of rotation 62 to impinge on an outer mirror 138a to be reflected via the pair mirror 136 back in the axial direction onto the associated conical mirror segment 120a. This beam is focussed to a spacially-fixed line to scan the mask holder 140 at the outer extremity of the relevant spoke by virtue of the circumferential movement of the mask holder. As the structure 120 rotates the next wheel 128b brings a mirror 138b into the alignment position. To impinge on this mirror the beam is switched by means to be described to a path 32b parallel and closer to the axis 62. This is diagrammatically shown by the dashed line optical path in FIG. 5 though it will be appreciated that at that point in the rotation this path has not yet been established. Further rotation successively brings into the beam interception position a mirror 138a of the wheel 128c and then a mirror 138b of the wheel 128d, and so on. For the sequence being described an odd number of wheels should be provided, that is five, seven and so forth. Taking five wheels by way of illustration the next beam interception will be by an outer mirror 138a of the fifth wheel. Following a 45° rotation of structure 120 from the position seen in FIG. 6, the next intercepting mirror is a mirror 138b on the next spoke of wheel 128a. Thus the sequence continues until after a 90° rotation the position is again as seen in FIGS. 5 and 6. Thus the sequence repeats every 720/n degrees where n is the number of spoke per wheel, and successive wheels along the shaft are angularly offset by 360/(n·m) degrees where m is the number of wheels.

It will be appreciated that if all the outer mirrors were arranged on a common circle, which is possible, it is more difficult to pack in the total number of mirrors similarly to the packing shown in FIG. 2. By alternating the outer mirrors on inner and outer circles the angular packing density is halved. There is an additional benefit. As mentioned in connection with FIG. 3, as the beam 32 moves from the mirror segment 71a of one set to the segment 71b of the next set, the intensity of the line focus on the mask is reduced during the period that the beam is partly on both segments. The actual scanning of the mask should be completed in the period during which the beam is fully intercepted by a mirror segment.

Reverting to FIG. 6, it will be seen that the intercepting plane mirror 138a of wheel 124a is angularly overlapped by a mirror 138b of the next wheel 124b shown in dashed line. The beam switching between paths 32a and 32b is arranged to occur at a point 142 at which the beam is fully on mirror 138a to be fully on mirror 138b. This overlap exists between all the succession of mirrors 138a and 138b to ensure the fullest use of the beam energy. It also has the advantage that the spoke portions do not in fact interface with the beam.

The input beam at 22 in FIG. 1 is being rapidly alternated between the two axes 32a and 32b. To accommodate the two beam axes, the end wall aperture 113a is supplemented by a second aperture 113b for the beam 32b or a single elongate slot is provided. Each of the conical mirror supports 124a–124d has a beam transmission slot 125. This may be better seen in the perspective view of FIG. 7 which shows just one wheel 128, with an outer circle mirror 138a intercepting the beam 32a to switch it via its mirror pair 136 onto the associated fixed conical mirror 120 which produces the line beam scanning the respective mask holder 140 projecting axially from the relevant spoke of the wheel 129. The line is refocussed by lens 90 onto the web 10, the line extending transversely of the web. The rotation of wheel 123 and movement of the web are indicated by arrows D and E respectively. After a sequence of beam interception by other wheels as described, the mirror 138b will intercept the beam which at that time will be switched to position 32b shown in dashed line to complete the optical path to conical mirror 122.

The switching of the beam to alternate between positions 32a and 32b will now be described with reference to FIGS. 8 and 9. The figures illustrate a beam chopper 160 which displaces the incoming beam 32 between the two axes 32a and 32b. For the arrangement of FIG. 1 the incoming beam is parallel to axis 62 and is to be switched between the two paths 32a and 32b also parallel to axis 62. FIG. 8 shows the chopper as an apertured disc 162 having a reflective front surface as seen in the face view of the disc (FIG. 9) with equiangularly located aperture sectors 164. The apertured and non-apertured sectors 164 and 166 respectively are of equal angular extent. The disc is mounted at an angle (conveniently 45°) to the beam impinging on it. Where the beam is reflected off a front surface sector 166 it is directed along the beam axis 32a. The disc apertures may either be furnished with a rear-reflecting surface, e.g. by a reflective disc 168 fastened at the rear or by open apertures that allow the beam to strike a fixed plane mirror 170 set at the same angle as disc 162. This produces the second switched beam 32b or 32b'. The choice of which method is used may depend on the displacement required between beams 32a and 32b. If the disc 162 with the rear reflective surface 168 is used then the disc thickness is obviously related to the displacement required.

The chopper disc 162 is rotated about its axis 163 by a drive (not shown) that is synchronized with the rotation of structure 120. Looking again at FIG. 6, the angle moved by that structure in moving from the beam impinging on a mirror 138a of one wheel to a mirror 138b of the next wheel is 360/mm degrees. If there are p apertured sectors 164 in the disc 162, the disc will need to have moved from a reflective front sector to an aperture, that is 180/p degrees. Thus the rate of rotation of disc 162 relative to that of structure 120 is nm/2p. If as shown p=n=8, then the ratio is simply m/2. Thus for a five or seven wheel structure the ratio is 2.5 or 3.5.

Also referring again to FIG. 6 the relative position or phase of disc 162 should be set such that the incoming beam crosses the edge between sectors at the point 140.

We claim:

1. An optical apparatus for use in producing an image on a moving sheet of material, comprising a beam entry point for receiving a laser beam in a predetermined alignment, at least one mask-receiving means for receiving a mask bearing an image, optical means including first and second optical elements carried by a structure repetitively movable in a predetermined path to intercept the beam at different times in each such movement to switch the beam to the at least one mask-receiving means, and said optical means being adapted to focus the received laser beam to a line at the mask-receiving means to which the beam is switched, the mask-receiving means and optical means being so arranged to provide a relative motion between the line and the mask-receiving means at which it is focussed for scanning a mask received therein.

2. An optical apparatus as claimed in claim 1 in which said structure is rotatably mounted, whereby each of said elements describes an arcuate path.

3. An optical apparatus as claimed in claim 1 comprising drive means coupled to said structure to continuously rotate same.

4. An optical apparatus as claimed in claim 3 in which the first and second optical elements are adapted to focus the beam intercepted thereby to a line fixed in space as the intercepting elements move and in which the at least one mask-receiving means is mounted to said structure to move in synchronism therewith so as to effect scanning with respect to the relevant spacially fixed line.

5. An optical apparatus as claimed in claim 4 in which said first and second optical elements comprise conical mirror segments mounted to have their cone axes coincident with the axis of rotation of said structure.

6. An optical apparatus as claimed in claim 1 in which said first and second optical elements are mounted to intercept the received laser beam at different points along the beam to provide respective line focusses that are spacially separated.

7. An optical apparatus as claimed in claim 6 in which said first optical element is one of a first set of like elements mounted to intercept the received beam at the same first point along its path and at different times during the movement of said structure, and said second optical element is one of a second set of like elements mounted to intercept the received beam at a second point along its path and at different times during the movement of said structure that are interleaved with the beam interceptions of the first set of elements.

8. An optical apparatus as claimed in claim 4 in which the elements of the first set provide respective line segments at the same first spacial point upon their respective interceptions of the beam and the elements of the second set provide respective focussed lines at the same second spacial point upon their respective interceptions of the beam.

9. An optical apparatus as claimed in claim 5 in which the elements of the first set have conical surfaces that are segments of a first cone and the elements of the second set have conical surfaces that are segments of a second cone.

10. An optical apparatus as claimed in claim 8 comprising first and second fixed devices for re-imaging the focussed lines at said first and second points respectively to third and fouth spacially fixed points respectively.

11. An optical apparatus as claimed in claim 1 in which said optical means includes at least one fixed optical element for focussing the beam to a line.

12. An optical apparatus as claimed in claim 11 in which said first and second optical elements comprise plane mirrors.

13. An optical apparatus as claimed in claim 9 in which said first and second elements are mounted for beam interception at different points along the beam and in which a respective fixed optical element is associated with said first and second elements to receive the beam intercepted thereby and focus same to a line.

14. An optical apparatus as claimed in claim 3 including a fixed optical element that comprises a conical mirror segment.

15. An optical apparatus as claimed in claim 14 in which said first optical element is one of a first set of like elements mounted to perform beam interception at a first point and at different times during the movement of said structure, and said second optical element is one of a second set of like elements mounted to perform beam interception at a second displaced from the first pint in the direction of beam impingement thereon and at different times during the movement of said structure that are interleaved with the beam interception of the first set of elements.

16. An optical apparatus as claimed in claim 15 in which each optical element of the first and second sets comprises a pair of plane mirrors.

17. An optical apparatus as claimed in claim 15 in which the optical elements of the first set are offset from those of the second set as seen normal to the direction of beam impingement and further comprising a further optical path switching means for receiving an input beam directed to said entry point and for switching said beam to first and second paths intercepted by said first and second sets of elements respectively, said further optical path switching means being operable in synchronism with the movement of said structure.

18. Apparatus for repetitively marking a moving sheet of material with an image comprising:
an optical apparatus for use in producing an image on a moving sheet of material, comprising a beam entry point for receiving a laser beam in a predetermined alignment, at least one mask-receiving means for receiving a mask bearing an image, optical means including first and second optical elements carried by a structure repetitively movable in a predetermined path to intercept the beam at different times in each such movement to switch the beam to the at least one mask-receiving means, and said optical means being adapted to focus the received laser beam to a line at the mask-receiving means to which the beam is switched, the mask-receiving means and optical means being so arranged to provide a relative motion between the line and the mask-receiving means at which it is focussed for scanning a mask received therein;
means for generating and providing a laser beam at said beam entry point of the optical apparatus;
at least one mask in the mask-receiving means; and
means for moving a sheet along a predetermined path to receive images of the mask scanned by a line segment.

19. Apparatus as claimed in claim 18 in which said means for generating and providing the laser beam includes a continuous wave laser, means for monitoring the alignment of the laser beam at the entry point to provide a signal indicating error in alignment and means in the laser beam path to said beam entry point for adjusting the alignment of the laser beam in accord with said error signal.

20. Apparatus as claimed in claim 19 further comprising means connected in a feedback path with the laser to monitor and regulate the laser output.

21. A method of marking sheet material moving along a predetermined path comprising the steps of:
continuously moving said sheet along said path;
controllably directing a beam of light to a marking location along said path to mark the sheet at intervals along its length, said controlled beam directing being effected by:
repetitively completing an otherwise interrupted optical path terminating at said marking location by repetitively moving optical switching means into a position completing an optical connecting between an input portion and an output portion of said optical path, said output portion terminating at said marking location;
focussing said beam to a predetermined elongate configuration, and projecting said elongate configuration to said marking location with said elongate configuration extending transversely to the direction of sheet movement thereat;
effecting a relative movement between an image-bearing mask and said predetermined elongate configuration in synchronism with the completion of said optical path by said optical switching means, said relative movement being effected in a direction essentially normal to said predetermined elongate configuration whereby said elongate configuration scans the mask image and is modulated thereby during the scanning to provide the modulated elongate configuration at said marking location and to reproduce the mask image on the sheet as the sheet moves past said marking location.

22. A method as claimed in claim 21 in which movement said relative movement is effected between the mask and the predetermined beam configuration at said marking location to thereby modulate the predetermined configuration.

23. A method as claimed in claim 21 in which said beam is focussed to said predetermined configuration at a point in the optical path preceding said marking location and the predetermined configuration is re-imaged at said marking location, and in which said relative movement is effected between the mask and the predetermined configuration at said point to thereby modulate the predetermined configuration as re-imaged at said marking location.

24. A method as claimed in claim 21 in which the focussing of the beam of light is performed by the optical path switching means.

25. A method as claimed in claim 21 in which the focussing of the beam of light is performed by optical means separate from the optical path switching means.

26. A method as claimed in claim 21 in which said optical switching means is moved around a circular path intercepting said optical path.

27. A method as claimed in claim 26 in which the focussing of the beam of light is performed by said optical path switching means;
said predetermined elongate configuration is a line fixed in space; and
said relative movement between said image-bearing mask and said fixed line is effected by movement of said image-bearing mask.

28. A method as claimed in claim 27 in which said movement of said image-bearing mask is in a circular path.

29. A method as claimed in claim 28 in which said image-bearing mask and said optical switching means move around their respective circular paths at the same angular velocity.

30. A method as claimed in claim 21 in which said optical switching means comprises a conical mirror, the cone axis of which coincides with the axis of said circular path.

31. A method as claimed in claim 22 in which said beam is focussed to said predetermined elongate configuration at said marking location.

32. A method of marking sheet material moving along a predetermined path comprising the steps of:
continuously moving said sheet along said path;
controllably directing a beam of light to first and second marking locations along said path that are spaced transversely to the direction of sheet movement in order to mark the sheet at transversely spaced locations at intervals along its length, said controlled beam directing being effected by:
repetitively and alternately completing first and second otherwise interrupted optical paths terminating at said first and second marking locations respectively by repetitively moving optical switching means into positions completing an optical connection between an input portion common to said first and second optical paths and a respective output portion of each of said first and second optical paths, said first and second path output portions terminating at said first and second marking locations;
focussing said beam to a predetermined elongate configuration and projecting said elongate configuration to said first and second marking location respectively each time that said first and second optical path is completed, said elongate configuration extending transversely to the direction of sheet movement at the respective marking location;
effecting a relative movement between a first or a second image-bearing mask and said predetermined elongate configuration in synchronism with the completion of said first or second optical path respectively by said optical switching means, said relative movement being effected in a direction essentially normal to said predetermined elongate configuration whereby said elongate configuration scans the respective first or second mask image and is modulated thereby during the scanning to provide the modulated elongate configuration at said first or second marking location respectively and to reproduce the respective first or second mask image on the sheet as the sheet moves past said respective first or second marking location.

33. A method as claimed in claim 32 in which said optical switching means comprises first and second optical elements moved in first and second circular paths respectively that are spaced transversely with respect to the direction of sheet movement, said first and second optical elements intercepting said path input portion at different times.

34. A method as claimed in claim 33 in which the focussing of the beam of light is performed by each of said first and second optical elements as it intercepts said input portion of the optical path;
said predetermined elongate configuration produced at each such interception is a line fixed in space; and
said relative movement between said first or second image-bearing mask and said fixed line is effected by movement of the respective image-bearing mask.

35. A method as claimed in claim 34 in which said first and second image-bearing masks move in respective circular paths of the same radius and having a common axis of rotation.

36. A method as claimed in claim 35 in which said first and second optical switching elements and said first and second image-bearing masks move around their respective circular paths at the same angular velocity.

37. A method as claimed in claim 33 in which each of said first and second optical switching elements comprises a respective conical mirror whose cone axis coincides with the axis of the circular path about which the conical mirror moves.

38. A method as claimed in claim 32 in which relative movement between said first or said image-bearing mask and said predetermined elongate configuration is effect at said first or second marking location respectively to thereby modulate said predetermined configuration at the respective marking location.

39. A method as claimed in claim 38 in which said beam is focussed to said predetermined elongate configuration at each of said first and second marking locations as each of said first and second optical paths is completed.

40. A method as claimed in claim 32 in which, each occasion that said first or second optical path is completed, said beam is focussed to said predetermined elongate configuration at a point in the completed optical path preceding said first or second marking location respectively, and the predetermined elongate configuration is re-imaged at the respective marking location, and in which said relative movement in said first or second completed optical path is effected between said first or second mask respectively and the predetermined elongate configuration at said point in the completed optical path to thereby modulate the predetermined elongate configuration as re-imaged at said marking location.

41. A method as claimed in claim 32 in which the focussing of the beam of light is performed by said optical switching means.

42. A method as claimed in claim 32 in which the focussing of the beam of light is performed by optical means separate from said optical switching means.

43. An optical apparatus as claimed in claim 15 in which a respective fixed optical element is associated with each of said first and second sets of elements.

44. An optical apparatus as claimed in claim 16 in which the plane mirrors of each pair are set at right angles to one another, to reverse the direction of the beam impinging thereon.

* * * * *